(12) United States Patent
Reuter et al.

(10) Patent No.: US 10,601,205 B2
(45) Date of Patent: Mar. 24, 2020

(54) CONNECTION ARRANGEMENT FOR THE CONNECTION OF TWO SWITCHGEAR CABINET FRAMEWORKS

(71) Applicant: RITTAL GMBH & CO. KG, Herborn (DE)

(72) Inventors: Wolfgang Reuter, Liebenscheid (DE); Daniel Brück, Sinn (DE)

(73) Assignee: Rittal GmbH & Co. KG, Herborn (DE)

( * ) Notice: Subject to any disclaimer, the term of this patent is extended or adjusted under 35 U.S.C. 154(b) by 0 days.

(21) Appl. No.: 16/345,874

(22) PCT Filed: Dec. 4, 2017

(86) PCT No.: PCT/DE2017/101042
§ 371 (c)(1),
(2) Date: Apr. 29, 2019

(87) PCT Pub. No.: WO2018/108206
PCT Pub. Date: Jun. 21, 2018

(65) Prior Publication Data
US 2019/0252866 A1    Aug. 15, 2019

(30) Foreign Application Priority Data
Dec. 12, 2016  (DE) .......................... 10 2016 124 078

(51) Int. Cl.
| A47B 29/00 | (2006.01) |
| H02B 1/30 | (2006.01) |
| A47B 96/14 | (2006.01) |

(52) U.S. Cl.
CPC ......... H02B 1/308 (2013.01); A47B 96/1408 (2013.01); A47B 96/1416 (2013.01)

(58) Field of Classification Search
CPC .. H02B 1/308; A47B 96/1408; A47B 96/1416
See application file for complete search history.

(56) References Cited

U.S. PATENT DOCUMENTS

| 4,643,319 A * | 2/1987 | Debus ...................... H02B 1/01 |
| | | 211/182 |
| 5,285,602 A * | 2/1994 | Felton ................ A47B 96/1416 |
| | | 52/127.2 |

(Continued)

FOREIGN PATENT DOCUMENTS

| DE | 19737668 A1 | 7/1998 |
| DE | 10157979 C1 | 4/2003 |

(Continued)

OTHER PUBLICATIONS

International Search Report (in English and German) and Written Opinion (in German) issued in PCT/DE2017/101042, dated Mar. 9, 2018; ISA/EP.

*Primary Examiner* — Matthew W Ing
(74) *Attorney, Agent, or Firm* — Harness, Dickey & Pierce, P.L.C.

(57) ABSTRACT

A connection arrangement having a first and a second switchgear cabinet framework which each have a rectangular, lateral profile frame composed of two vertical struts and two horizontal struts, wherein the profile frames are connected to one another via an aligning connector, wherein the switchgear cabinet frameworks adjoin one another via outer sealing edges of the profile frames, wherein the outer sealing edges are arranged on the respective free end of a sealing web of the profile frame, wherein a fastening flange is bent off from each of the sealing webs so as to be set back from the outer sealing edge, with the result that the opposite fastening flanges delimit between them a receptacle for an aligning connector for the profile frames, which receptacle is further delimited by the adjoining sealing webs and, where appropriate, a sealing element arranged between the sealing webs, and wherein an aligning connector is arranged in the receptacle and is secured to the opposite fastening flanges.

14 Claims, 10 Drawing Sheets

(56) References Cited

U.S. PATENT DOCUMENTS

| | | | |
|---|---|---|---|
| 6,435,759 B1 | 8/2002 | Root | |
| 7,661,730 B2* | 2/2010 | Meinig | F16L 23/04 |
| | | | 285/365 |
| 9,871,353 B2 | 1/2018 | Boehme et al. | |
| 9,966,738 B2* | 5/2018 | Paul | H02B 1/013 |
| 9,991,684 B2 | 6/2018 | Brueck et al. | |
| 2001/0050516 A1 | 12/2001 | Minoura et al. | |
| 2002/0166831 A1* | 11/2002 | Klassen | E05D 5/023 |
| | | | 211/183 |
| 2003/0172613 A1* | 9/2003 | Fontana | H02B 1/306 |
| | | | 52/282.1 |
| 2011/0072729 A1* | 3/2011 | Otsuka | B60J 10/24 |
| | | | 49/490.1 |
| 2016/0352080 A1 | 12/2016 | Brueck et al. | |
| 2016/0352082 A1 | 12/2016 | Boehme et al. | |
| 2016/0352083 A1 | 12/2016 | Brueck et al. | |
| 2018/0375302 A1 | 12/2018 | Reuter et al. | |

FOREIGN PATENT DOCUMENTS

| | | |
|---|---|---|
| DE | 10110689 B4 | 8/2007 |
| DE | 102008034775 A1 | 2/2009 |
| DE | 102014101401 A1 | 8/2015 |
| DE | 102014101404 A1 | 8/2015 |
| DE | 102015121192 A1 | 6/2017 |
| EP | 0872930 A2 | 10/1998 |
| EP | 1601074 A1 | 11/2005 |
| WO | WO-9937004 A1 | 7/1999 |

* cited by examiner

Fig. 11 ical Field

CONNECTION ARRANGEMENT FOR THE CONNECTION OF TWO SWITCHGEAR CABINET FRAMEWORKS

CROSS-REFERENCE TO RELATED APPLICATIONS

This application is a 371 U.S. National Stage of International Application No. PCT/DE2017/101042, filed on Dec. 4, 2017, which claims priority to German Application No. 10 2016 124 078.8, filed on Dec. 12, 2016. The entire disclosures of the above applications are incorporated herein by reference.

BACKGROUND

This section provides background information related to the present disclosure which is not necessarily prior art.

TECHNICAL FIELD

The invention proceeds from a connection assembly that comprises a first and a second switchgear cabinet rack which each comprise a rectangular, lateral profile frame consisting of two vertical struts and two horizontal struts, and the profile frames being interconnected by means of a modular connector. A connection assembly of this kind is known for example from DE 101 10 689 B4. DE 101 57 979 C1 and WO 99/37004 A1 also disclose similar connection assemblies.

DISCUSSION

In particular the following two requirements are made of connection assemblies of this kind: firstly, the modular connector used should, as far as possible, be installed on the profile frames, to be interconnected, in such a way as to occupy as little installation space as possible and to thus not be an obstacle to an efficient internal construction of the switchgear housing, and, secondly, the connection assembly should be simple to handle, for which purpose it is necessary for it to always be possible for the modular connector to be fixed to the profile frames, to be interconnected, with negligible effort when the profile frames are aligned more or less exactly, relative to one another.

In the case of the connection assembly known from DE 101 10 689 B4, the modular connector is installed in a space-saving manner by means of being received in a receptacle formed between the mutually adjacent profile frames. However, since the modular connector is fixed by means of two profile sides that are aligned so as to be perpendicular to a sealing plane formed between the profile frames, in order to mount the modular connector on the mutually adjacent profile frames it is always necessary for said profile frames to be exactly aligned, relative to one another, prior to mounting the modular connector, such that corresponding bolt passageways of the modular connector and the two profile frames are flush with one another.

SUMMARY

This section provides a general summary of the disclosure, and is not a comprehensive disclosure of its full scope or all of its features.

The aspect of the invention is therefore that of developing a connection assembly of the type described at the outset, so as to be both space-saving and easy to handle.

According thereto, the switchgear cabinet racks adjoin one another via the outer sealing edges of the profile frames, the outer sealing edges being arranged at the relevant free end of a sealing rib of the profile frames. In each case a fastening flange is chamfered from the sealing ribs, so as to be set back relative to the outer sealing edge, such that the mutually opposing fastening flanges define therebetween a receptacle for a modular connector for the profile frames, the receptacle furthermore being delimited by the mutually adjacent sealing ribs and optionally a sealing element arranged between the sealing ribs. Furthermore, a modular connector is arranged in the receptacle and fixed to the opposite fastening flanges.

The fact that the opposite fastening flanges to which the modular connector is fixed are aligned so as to be in parallel with the sealing plane formed between the sealing edges, makes it possible for the profile frames to be able to be loosely interconnected by the modular connector even in the case of profile frames that are roughly pre-aligned relative to one another, such that the profile frames can be aligned relative to one another when the profile frames are fixed to the modular connector. For this purpose it is conceivable, for example, for the fastening flanges to be fixed to the relevant fastening sides of the modular connector by means of screw connections, for which purpose the fastening sides of the modular connector may comprise threaded receptacles for example.

One of the outer sealing edges may be formed by an edge folded by more than 180°, such that the sealing rib tapers from the sealing edge towards the fastening flange and/or is formed in the manner of an undercut. This embodiment in particular allows for secure seating of slip-on seal on the sealing rib. According thereto, it is possible for a slip-on seal to be slipped onto the sealing rib over the sealing edge of at least one of the sealing ribs, which slip-on seal comprises a groove that tapers towards the opening thereof.

The groove may be delimited by two side walls of the slip-on seal that taper conically towards one another, at least one of the side walls comprising a projection that further tapers the groove. The projection, in particular in combination with the undercut geometry of the sealing edge, achieves particularly secure seating of the slip-on seal on the sealing rib.

The groove may be delimited by two side walls, between the free ends of which the opening of the groove is formed, the groove further being delimited by a rear wall that connects the side walls at the ends thereof opposite the free ends, which rear wall comprises an adhesion promoter in particular an adhesive layer, on the inner face thereof that faces the groove. This measure, too, contributes to further improving the secure seating of the slip-on seal on the sealing rib.

At least one of the fastening flanges can transition into the relevant sealing rib via a 90° bend. The profile frame may in particular be formed by profile struts that have a geometry, in cross-section, as is described in the subsequently published document DE 10 2015 121 192 A1. DE 10 2014 101 404 A1 also discloses a similar geometry. According thereto, at least one of the profile frames may comprise a further profile side on an outer face that is remote from the sealing edge thereof, which further profile side is arranged so as to be spaced apart from, preferably spaced apart in parallel with, the fastening flange of the profile frame, the fastening flange and the further profile side spaced apart therefrom each comprising at least one passageway for the fastening means, and at least one of the passageways of the fastening flange being flush with at least one of the passageways of the further profile side. As a result, the modular connector can be fixed to the fastening flange from the further profile side, via the flush passageways. For this purpose, it is possible for example for a threaded bolt to be inserted into the profile frame through the further profile side until said bolt leaves the profile frame again at the fastening flange, in order to there enter the fastening side of the modular connector, in particular in a threaded receptacle of the fastening side, in order to thus fix the fastening side to the fastening flange.

The fastening means can therefore in particular be a fastening bolt, for example a threaded bolt or a screw. The fastening means can extend from the outer face remote from the sealing edge, through the flush passageways, and into the receptacle.

Furthermore, the fastening means may be fixed, at the free end thereof by which the fastening means protrudes into the receptacle, in a fastening receptacle in a fastening side of the modular connector, via which the modular connector rests on one of the fastening flanges.

The modular connector may comprise two opposing fastening sides, via which said connector is fixed to one of the opposing fastening flanges in each case.

The fastening sides of the modular connector can be interconnected via a connection side, the modular connector resting on one of the two sealing ribs in a transition region, in each case, between the connection side and one of the two fastening sides, and the connection side protruding, at a spacing from the sealing ribs, beyond a joint region in which the sealing ribs adjoin one another via a sealing element arranged therebetween, such that a free space is formed between the sealing ribs and the connection side, into which space the sealing element protrudes. A particularly space-saving connection assembly is thus achieved.

The connection side may comprise at least one arrow punching. The arrow punching may be used in particular, in conjunction with a further marking on the profile strut of the profile frame to which the modular connector is intended to be fixed, to make it possible to achieve a desired positioning of the modular connector relative to the profile strut, for example arranging the modular connector at a specified vertical height. It may furthermore be possible for a threaded bolt, by means of which the modular connector is fixed to one of the fastening flanges, to protrude into the arrow punching, at least one clamping tooth engaging, in a preloaded manner, in a thread of the threaded bolt at a boundary of the arrow punching, and thus fixing the threaded bolt.

The threaded bolt can furthermore comprise an apex that transitions into the thread of the threaded bolt, such that the at least one clamping tooth is preloaded along the apex, which widens in the longitudinal direction of the bolt, when the modular connector is fixed to one of the fastening flanges.

The modular connector may be formed in one piece or in multiple parts. If the modular connector is formed in one piece, it is possible in particular for said connector to be formed as a punched and edged sheet metal molding, it being possible for the fastening sides of the modular connector to comprise suitable fastening means for fixing the modular connector to the fastening flanges of the profile struts. Said fastening means may for example be designed in the form of a threaded passage or a threaded nut that is welded on or fixed in another manner.

It is thus conceivable for the modular connector to be formed in multiple parts, and in particular in two parts, comprising a first connector part that is fixed to a first of the opposing fastening flanges, and comprising a second connector part that is fixed to a second of the opposing fastening flanges, the first connector part comprising a centering contour on an outer face that faces the second connector part, and the second connector part comprising a second centering contour, complementary to the first centering contour, on an outer face that faces the first connector part, the first and the second centering contour interlocking only in a mounting position in which the lateral profile frames adjoin one another via the sealing edges thereof and optionally via a sealing element arranged therebetween.

The first and the second centering contour may each be formed in two parts, each comprising a first centering contour portion for aligning the profile frames relative to one another in the vertical direction, and each comprising a second centering contour portion for aligning the profile frames relative to one another in the depth direction. The two connector parts can each be fixed to one another so as to have an excess length, by means of a threaded bolt, such that the first and the second centering contour come to rest on one another, when the two connector parts approach one another when screwing in the threaded bolt, until said centering contours interlock in an end position relative to one another, in which the two connector part, and thus the two profile frames are aligned relative to one another.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further details of the invention will be explained in the following, with reference to the accompanying figures. In the figures.

DETAILED DESCRIPTION

Example embodiments will now be described more fully with reference to the accompanying drawings.

Figure 1:
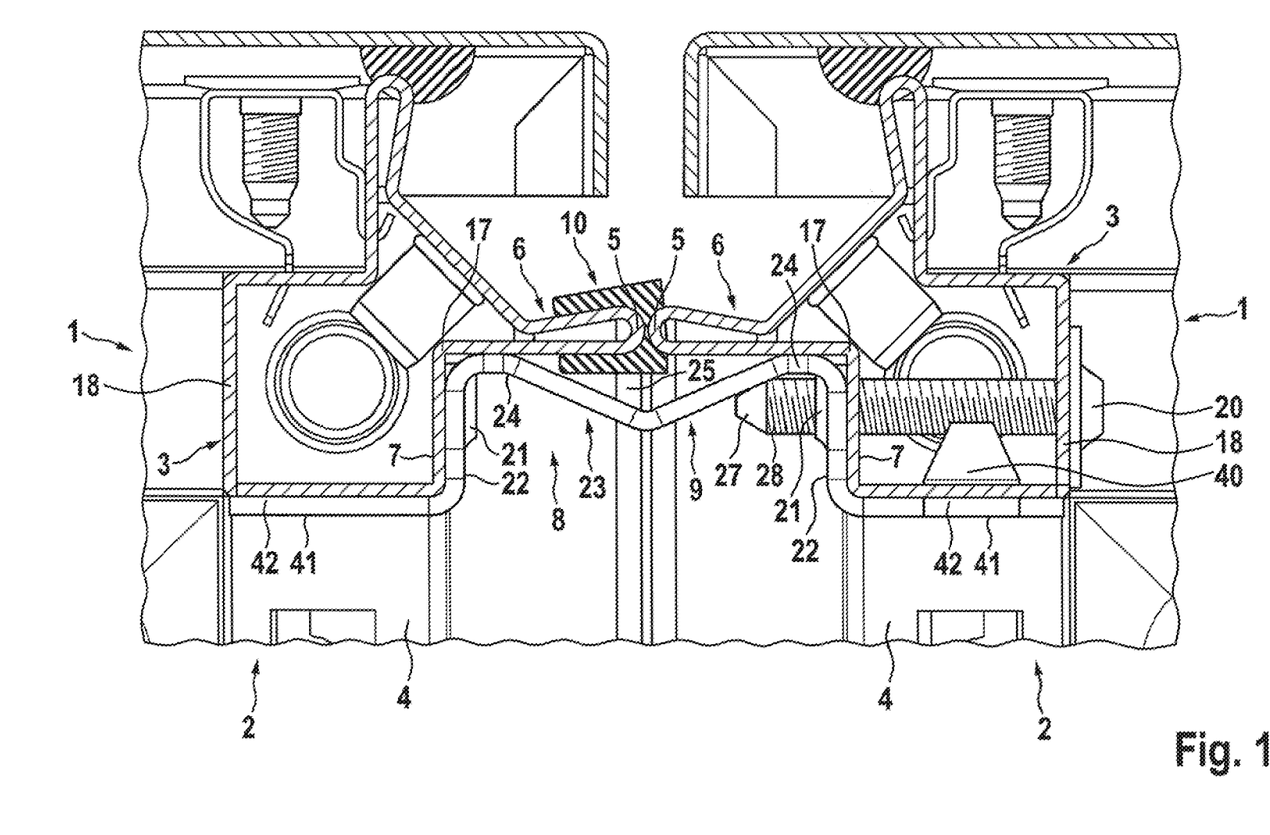
FIG. 1 is a horizontal cross section of a first embodiment of a connection assembly.

FIG. 1 shows a first embodiment of a connection assembly, in which a first and a second switchgear cabinet rack 1 are fixed to one another via a modular connector 9. The switchgear cabinet racks 1 each comprise a profile frame 2 via which said racks adjoin one another. The profile frame 2 itself is in turn formed of two vertical struts 3 and two horizontal struts 4, of which only one vertical strut 3 and one horizontal strut 4 is shown per profile frame 2. The profile frames 2 adjoin one another via sealing edges 5 formed at the end of the sealing struts 6, or via a sealing element 10 arranged therebetween, such that a sealing plane is formed that extends perpendicularly to the sealing ribs 6.

The modular connector 9 is formed as a punched and edged sheet metal molding that is fixed to fastening flanges 7 of the profile frames 2 via fastening sides 22. The fastening flanges 7 extend in parallel with the described sealing plane, and so as to be set back from the respective sealing edges 5 thereof, and are thus mutually spaced in parallel, so as to form a receiving space 8 therebetween, in which space the modular connector can be received in a space-saving manner and is thus received, with the exception of the support flange 21, exclusively in the clearance between the mutually adjacent profile frames 2. One of the support flanges 41 comprises a hook 40, via which the modular connector 9 engages in a system punched hole of the profile frame 2, such that the modular connector 9 is pre-aligned with respect to the relevant profile frame.

In order to fasten the two profile frames 2 to one another via the modular connector 9, it is conceivable, for example, for the modular connector 9 to be suspended in a first of the two profile frames 2, in this case the right-hand profile frame 2 in the drawing, via the hook 40 thereof, such that bolt passageways in the fastening flange 7 and the profile side 18 of the relevant vertical strut 3 are flush with one another and thus pre-aligned for a bolt 20 to pass through. The fastening side 22 comprises a fastening receptacle 21 in the form of a threaded passage, such that the modular connector 9 can be fixed to the right-hand profile frame 2 in the drawing, in particular the vertical strut 3 thereof, by means of the bolt 20 being screwed through the flush passageways in the profile sides 7 and 18.

In a second step, a slip-on seal 10 may be slipped onto at least one of the two sealing ribs 6 that are arranged in the sealing plane.

It can be seen that the modular connector 9 comprises a contour, the sides 41, 22, 24 of which represent an outer contour of the vertical strut 3, such that a pre-alignment of the left-hand profile frame 2 in the drawing, with respect to the modular connector 9, and thus with respect to the further profile frame 2, can be established by the approach of the left-hand vertical strut 3, in the drawing, forming an interlocking connection with the modular connector 9.

Figure 2:
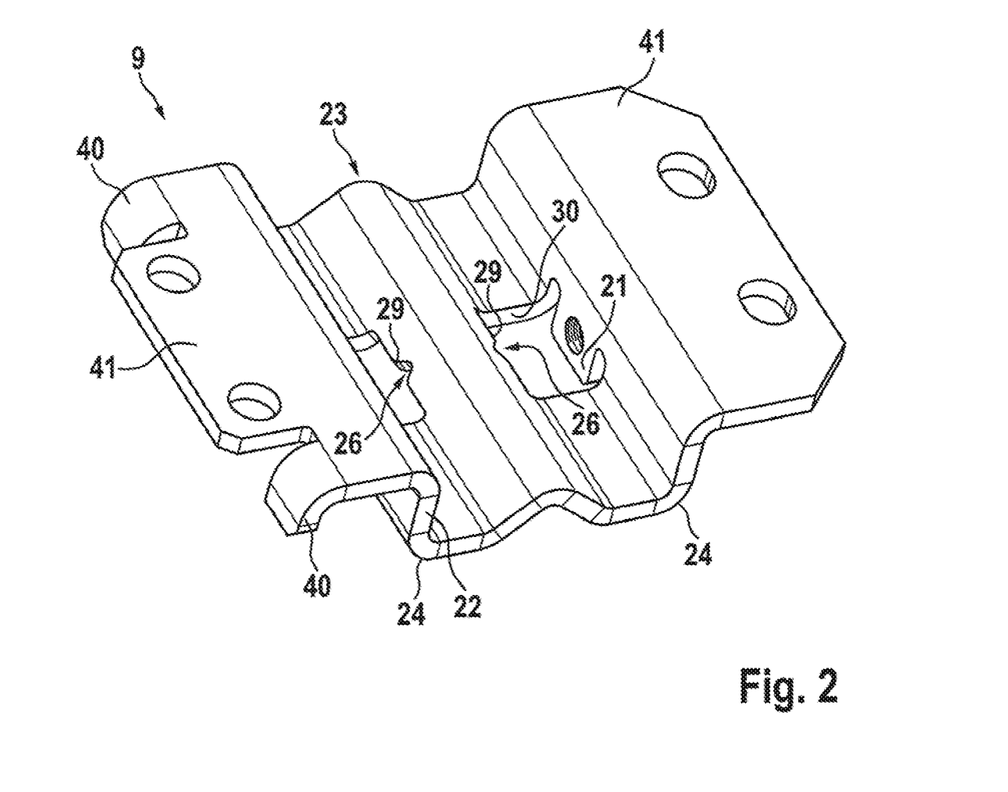
FIG. 2 shows a variant of the modular connector of the embodiment according to FIG. 1.

FIG. 2 is a detailed view of a variant of the modular connector 9 according to the embodiment shown in FIG. 1. Said modular connector comprises a support flange 41 at opposing ends thereof in each case, by means of which flanges the modular connector 9 can come to rest on a further profile side 41, as described with reference to FIG. 1, which further profile side extends so as to be at a 90° angle relative to the fastening flange 7. One fastening side 22 in each case, comprising a threaded passage 21, extends at a 90° angle relative to the support flange, which fastening sides are designed, in accordance with FIG. 1, to come to rest on the fastening flange 7 of the profile struts that are to be interconnected.

The fastening sides 22 transition into the connection side 23 via a transition region 25 in each case. The transition region 24 is designed to come to rest on the sealing rib 6 on the side of the sealing rib 6 that faces the receptacle 8 (cf. FIG. 1). Adjacently to the threaded passage 21, the modular connector 29 comprises an arrow punching 26 which can serve for positioning the modular connector 9 relative to the profile, for example by means of the arrow punching 26 being brought into coincidence with a corresponding marking on one of the profiled that are to be interconnected. The arrow punching 26 furthermore comprises two clamping teeth 29 at the boundary 30 thereof, which teeth are flush with the threaded passages 21 such that a bolt, screwed through the threaded passages 21, strikes the clamping teeth 29, for example when fully screwed in, such that the bolt is fixed with respect to the modular connector 9.

The connection side 23 furthermore comprises a central portion which is raised relative to the transition regions 24, as a result of which, as shown in FIG. 1, a receptacle 25 for a sealing element 10 is created between the transition region 24 and the sealing ribs 6.

Two hooks 40 are molded onto the right-hand support flange 41 in the drawing, by means of which hooks the modular connector 9, as has likewise already been described with reference to FIG. 1, can be suspended in one of the two profile struts to be interconnected, via a system punch hole or the like, and is thus pre-aligned for being screwed to a first profile of the profiles to be interconnected.

Thus, once the modular connector 9 has been pre-positioned relative to a first of the profile struts, by means of the hook 40, in accordance with the drawing in FIG. 1, and has been connected to said profile strut by means of the bolts 20, the second profile strut (the left-hand profile strut 3 in the drawing according to FIG. 1) can be moved closer to the assembly consisting of the first profile strut 3 and the modular connector 9 connected thereto, optionally after a slip-on seal 10 has been slipped onto at least one of the two sealing ribs 6 of the two profile struts 3, which sealing ribs are aligned relative to one another. When the further profile strut 3 has been brought into an interlocking connection with the modular connector 9, by means of the support flange 41 coming to rest on the further profile side 42, the fastening side 22 rests on the fastening flange 7 and the transition region 24 rests on the sealing rib 6, the further profile strut 3 that is thus pre-aligned with respect to the assembly consisting of the first profile strut 2 and the modular connector 9 still has a degree of freedom of movement in the direction perpendicular to the fastening flanges 7 or to the fastening sides 22. If, in a manner corresponding to the right-hand profile strut 3 in the drawing according to FIG. 1, a further connection bolt (not shown) is then inserted through the left-hand profile strut 3 in the drawing, via the profile side 18, through the interior of the profile strut 3 and through the fastening flange 7, until the bolt extends into the threaded passage 21 in the fastening side 22, the left-hand profile strut 3 in the drawing can be brought closer to the right-hand profile strut 3 in the drawing, by means of screwing the bolt further into the fastening receptacle 21, such that the sealing element arranged between the sealing ribs 6 is compressed and a sealing effect is thus achieved.

Figure 3:
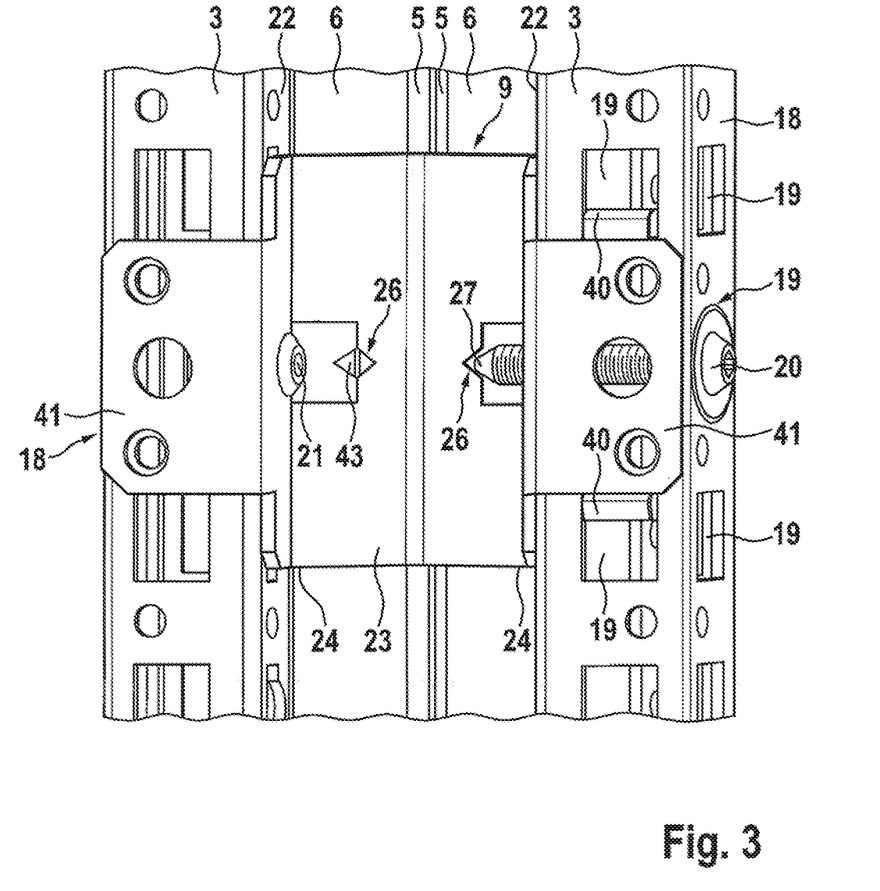
FIG. 3 is a side view of the connection assembly according to FIG. 1.

In FIG. 3, additionally to what is shown in the drawings according to FIGS. 1 and 2, it can also be seen that the arrow punching 26 is in particular suitable for pre-aligning the modular connector 9 with respect to the profile struts 3 to be interconnected. For this purpose, the profile strut 3, in particular the sealing rib 6 thereof, may comprise an assembly consisting of regularly spaced triangular punchings, as is shown in FIG. 3.

FIGS. 4 to 7 show a further embodiment of the connection assembly according to the invention. In this embodiment, the modular connector 9 is formed in two parts and comprises a first connector part 9.1 (FIG. 4) and a second connector part 9.2 (FIG. 5), one of which parts is fixed to a first of the profile struts 3 to be interconnected, and a second of which parts is fixed to the other profile strut in each case, and the two connector parts 9.1, 9.2 comprising the connected profile struts 3 subsequently being guided towards one another. Centering contours 31, 32 are formed on contact surfaces of the connector parts 9.1 and 9.2 which meet one another in this case, which centering contours are designed to align the profile struts 3 relative to one another when the two profile struts 3 approach one another, an interlocking connection between the centering contours 31, 32 being achieved precisely when exact positioning of the profile struts 3 relative to one another in the depth direction and in the vertical direction is achieved.

Figure 4:
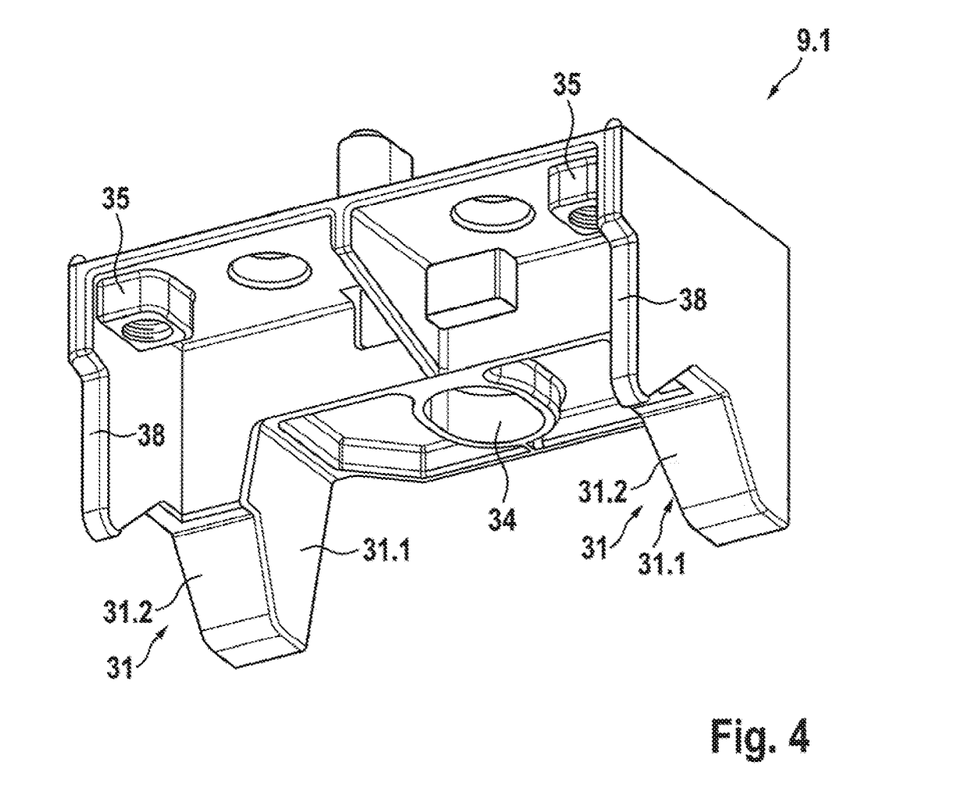
FIG. 4 shows a first connector part of a further embodiment of a modular connector.
Figure 5:
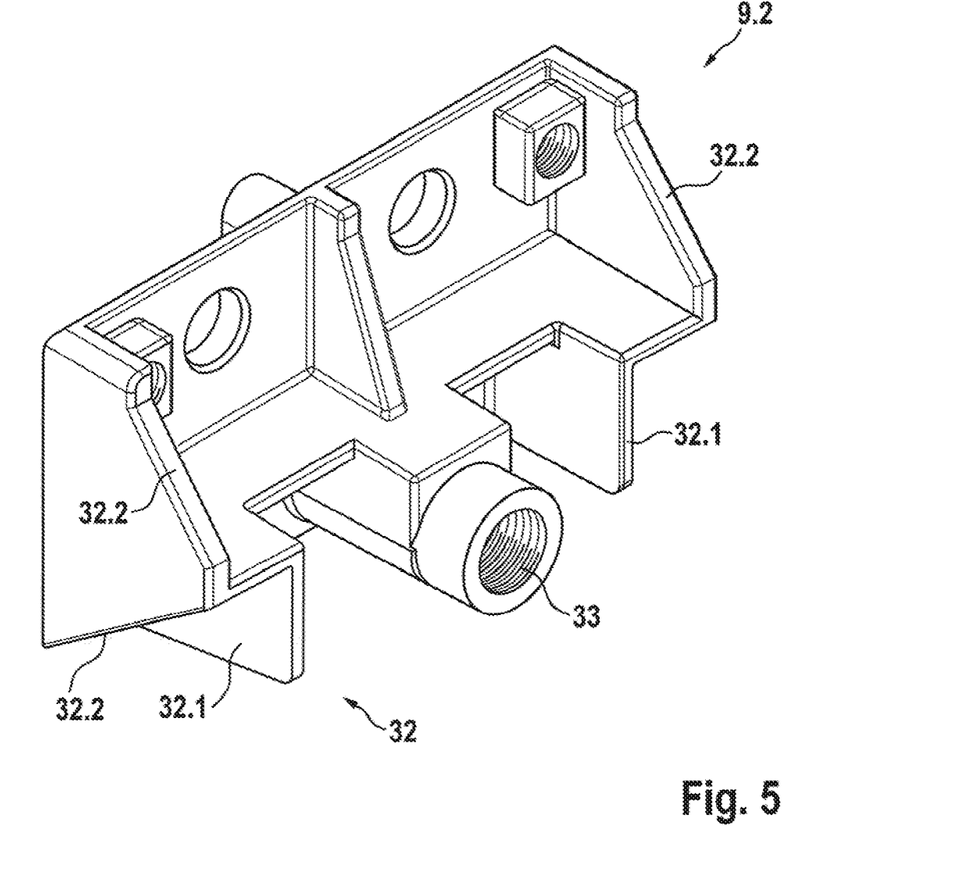
FIG. 5 shows a second connector part of a modular connector corresponding to the embodiment according to FIG. 4.
Figure 6:
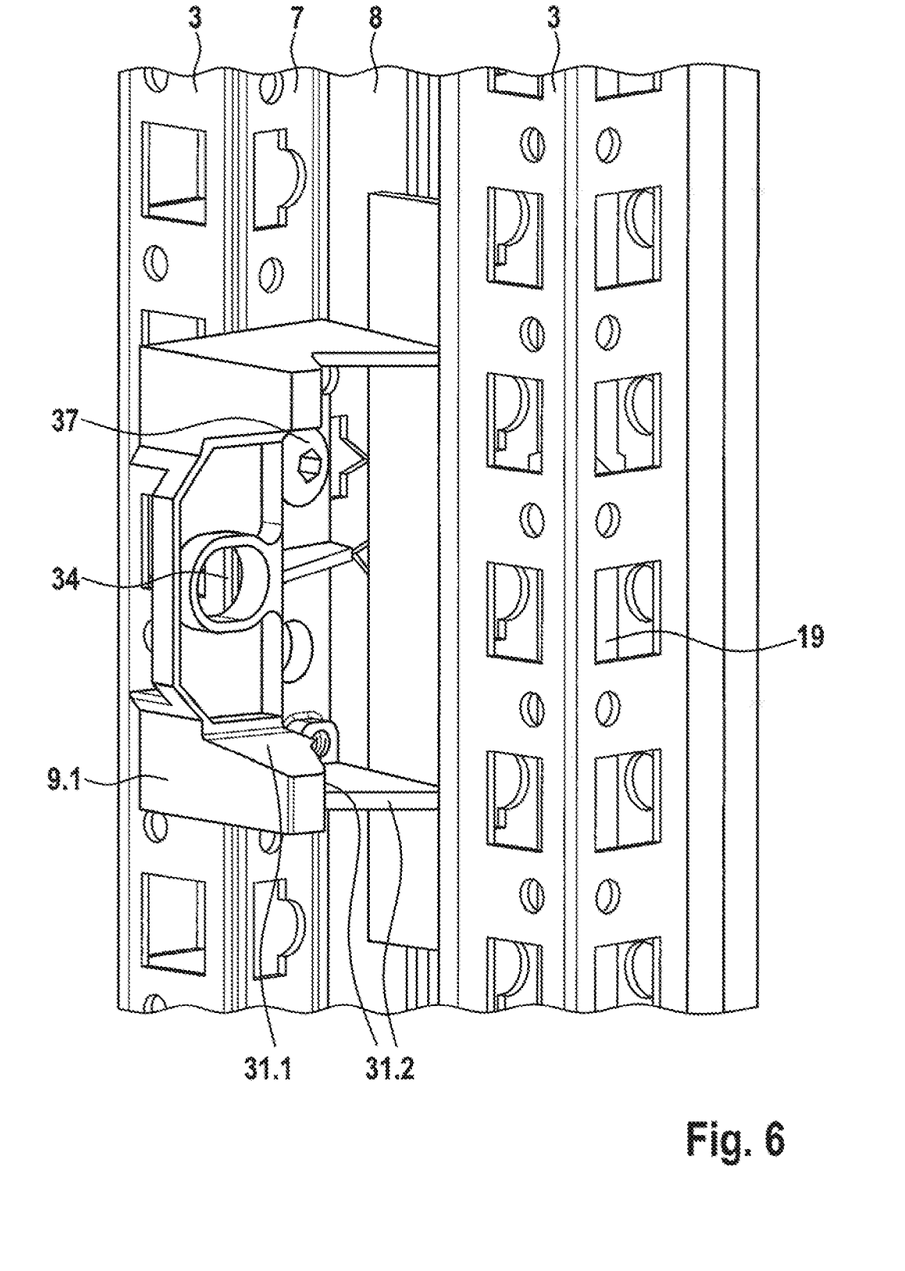
FIG. 6 shows the connector part according to FIG. 4 fixed to a vertical profile.
Figure 7:
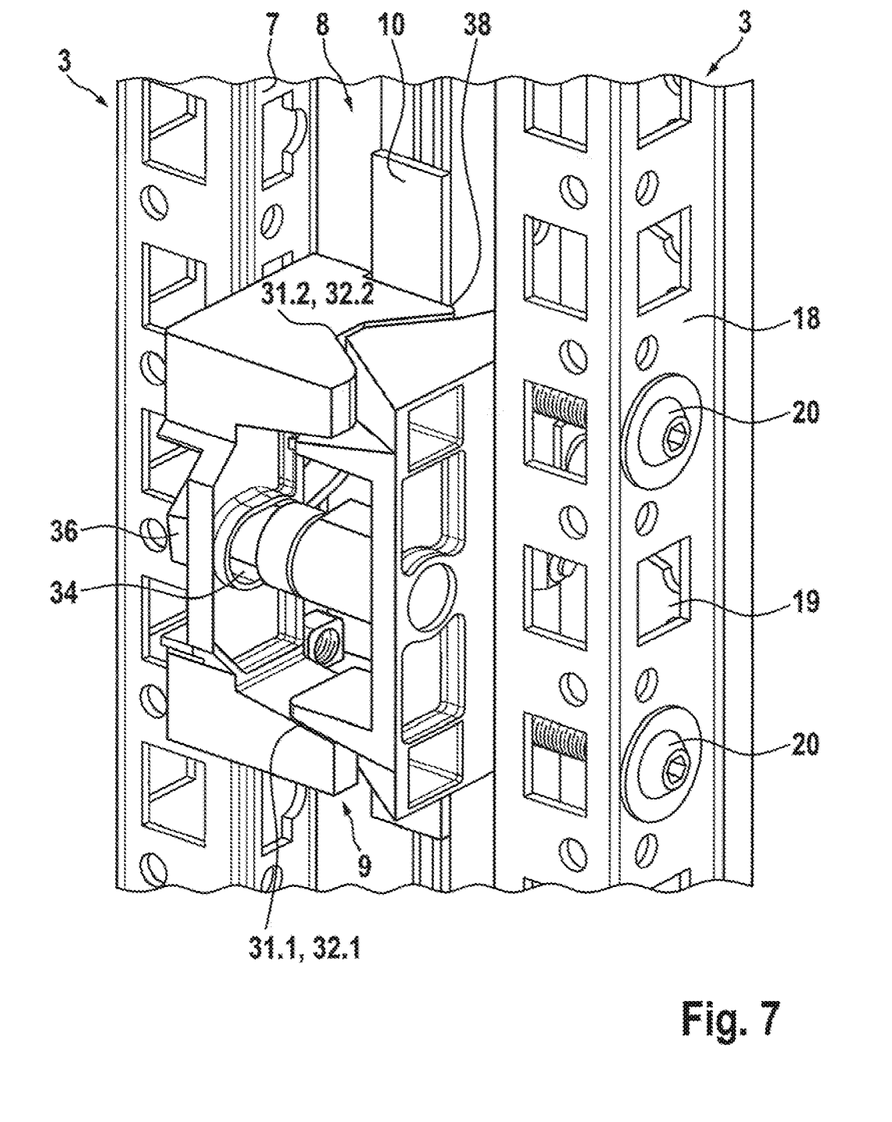
FIG. 7 shows a connection assembly using the connector parts according to FIGS. 4 and 5.

According thereto, the modular connector 9 is thus formed in two parts and comprises a first connector part 9.1 that is fixed to a first of the opposing fastening flanges 9. In a second step, the second connector part 9.2 is then fixed to the fastening flange 7 of the opposing profile strut 3. The first connector part 9.1 comprises a first centering contour 31 on an outer face that faces the second connector part 9.2, and the second connector part 9.2 comprises a second centering contour 32, complementary to the first centering contour 31, on an outer face that faces the first connector part 9.1. The first and the second centering contour 31, 32 are designed such that they interlock only in a mounting position in which the lateral profile frames 2 adjoin one another via the sealing edges 5 thereof and optionally via a sealing element 10 arranged therebetween.

In this case, the first and the second centering contours 31, 32 are formed in two parts, each comprising a first centering contour portion 31.1, 32.1 for aligning the profile frames 2 relative to one another in the vertical direction, and each comprising a second centering contour portion 31.2, 32.2 for aligning the profile frames 2 relative to one another in the depth direction.

Figure 8:
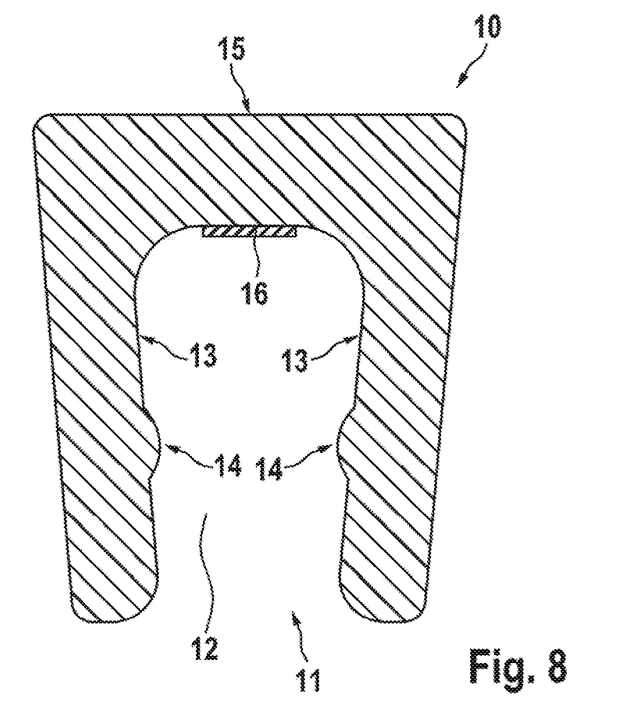
FIG. 8 is a cross-sectional view of a sealing element according to an embodiment of the invention.
Figure 9:
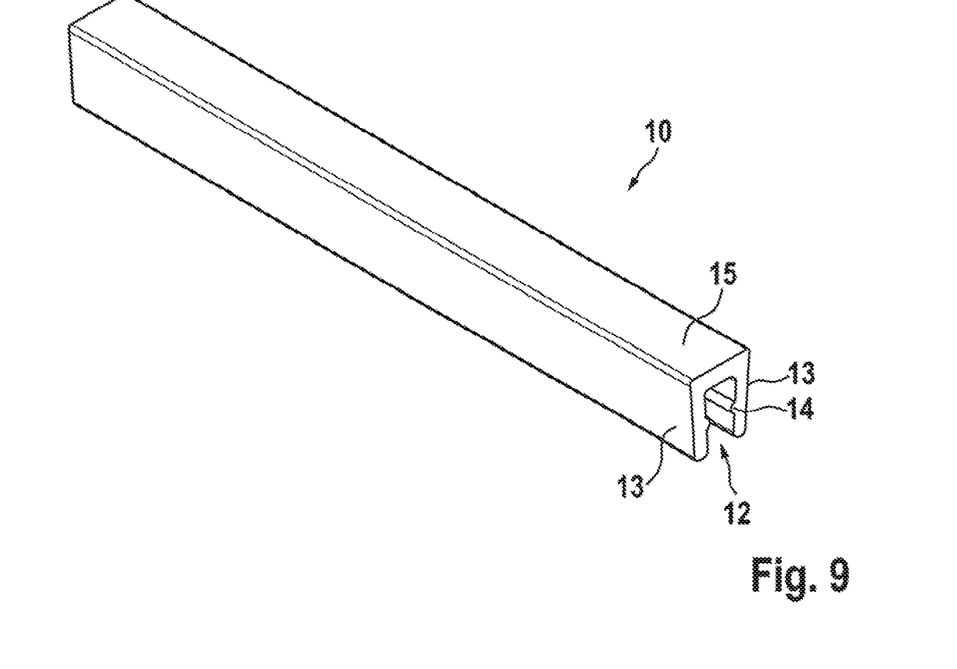
FIG. 9 is a perspective view of a sealing element according to FIG. 8.

A geometry of a slip-on seal 10 given by way of example is described in FIGS. 8 and 9. The slip-on seal 10 comprises a groove 12 that tapers towards the opening 11 thereof. In addition, the groove 12 is designed so as to be delimited by two side walls 13 that taper conically towards one another. In order for it to be possible to even better fix the slip-on seal 10 to the undercut sealing rib 6 (see FIG. 1), the slip-on seal 10 comprises a projection 14, which further tapers the groove 12, on the opposing side walls 13. In order for it to be possible to even better set the slip-on seal on the sealing rib 6, the groove comprises a rear wall 15 that connects the side walls 13 at the ends thereof opposite the free ends, which rear wall comprises an adhesion promoter 16, in the form of an adhesive layer, on the inner face thereof that faces the groove 12.

Figure 10:
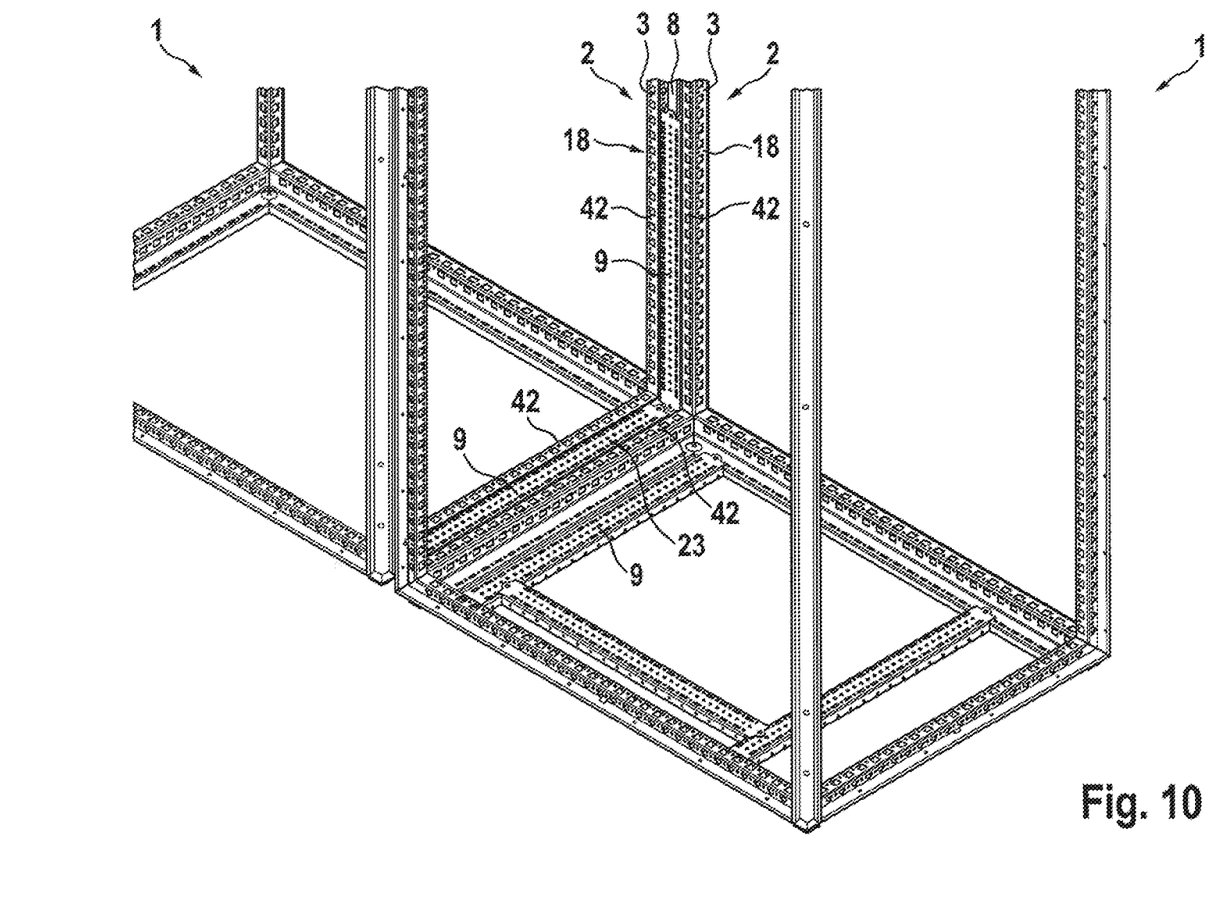
FIG. 10 shows a further embodiment of a connection assembly, in which the modular connector is designed as an internal chassis fitting.
Figure 11:
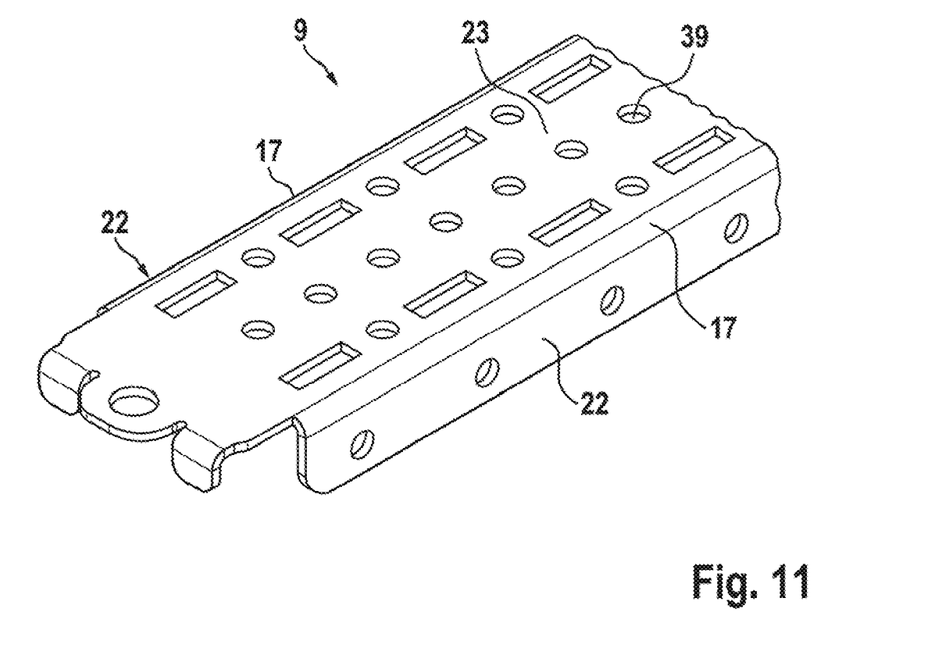
FIG. 11 is a detailed view of the modular connector according to FIG. 10.

FIGS. 10 and 11 show a further embodiment of a connection assembly, in which the modular connector 9 is already designed as a mounting chassis for the internal construction of the switchgear cabinet. According thereto, the modular connector 9 comprises a connection side 23 from which a fastening side 22 extends, on opposing longitudinal edges in each case, at a 90° angle, such that the modular connector 9 can come to rest on and be screwed to profile struts to be interconnected, at opposing fastening flanges 7, via the fastening sides 22, in a manner similar to the embodiment shown in FIG. 1.

The connection side 23 comprises a system punch hole 39 which can be arranged in a grid dimension and which corresponds to the grid dimension of the interconnected profile frame, such that a uniform grid dimension is maintained between the further profile sides 42 and the connection side 23, as a result of which the internal construction of the mutually adjacent switchgear cabinet racks 1 can also be achieved across racks, as shown in FIG. 10. In order to create a continuous mounting plane, the connection side 23 of the modular connector 9 and the further profile sides 42 can be arranged in the same plane.

The features of the invention disclosed in the above description, in the drawings, and in the claims, may be essential to the implementation of the invention both individually and in any desired combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A connection assembly that comprises a first and a second switchgear cabinet rack which each comprise a rectangular, lateral profile frame having two vertical struts and two horizontal struts, the profile frames being interconnected by a modular connector, wherein the switchgear cabinet racks adjoin one another via outer sealing edges of the profile frames, the outer sealing edges being arranged at each of the free ends of a sealing rib of the profile frame, a fastening flange in each case being chamfered from the sealing ribs, so as to be set back relative to the outer sealing edge, such that the mutually opposing fastening flanges define there between a receptacle for a modular connector for the profile frames, the receptacle furthermore being delimited by the mutually adjacent sealing ribs and a sealing element arranged between the sealing ribs, and a modular connector being arranged in the receptacle, which connector is fixed to the opposing fastening flanges, and wherein at least one of the outer sealing edges is formed by an edge folded by more than 180°, such that the sealing rib tapers from the sealing edge towards the fastening flange and/or is formed in the manner of an undercut.

2. The connection assembly according to claim 1, wherein a slip-on seal is slipped onto the sealing rib over the sealing edge of at least one of the sealing ribs, which slip-on seal comprises a groove that tapers towards the opening thereof.

3. The connection assembly according to claim 2, wherein the groove is delimited by two side walls of the slip-on seal that taper conically towards one another, at least one of the side walls comprising a projection that further tapers the groove.

4. The connection assembly according to claim 2, wherein the groove is delimited by two side walls, between the free ends of which the opening of the groove is formed, and the groove further being delimited by a rear wall that connects the side walls at the ends thereof opposite the free ends, which rear wall comprises an adhesive layer, on the inner face thereof that faces the groove.

5. The connection assembly according to claim 1, wherein at least one of the fastening flanges transitions into the relevant sealing rib via a 90° bend.

6. The connection assembly according to claim 1, wherein at least one of the profile frames comprises a further profile side on an outer face that is remote from the sealing edge thereof, which further profile side is arranged so as to be spaced apart from, preferably spaced apart in parallel with, the fastening flange of the profile frame, the fastening flange and the further profile side spaced apart therefrom each comprising at least one passageway for the fastening means, and at least one of the passageways of the fastening flange being flush with at least one of the passageways of the further profile side.

7. The connection assembly according to claim 6, wherein a fastener extends from the outer face remote from the sealing edge, through the flush passageways, and into the receptacle.

8. The connection assembly according to claim 7, wherein the fastener is fixed, at the free end thereof by which the fastener protrudes into the receptacle, in a fastening receptacle in a fastening side of the modular connector, via which the modular connector rests on one of the fastening flanges.

9. The connection assembly according claim 1, wherein the modular connector comprises two opposing fastening sides, via which said connector is fixed to one of the opposing fastening flanges in each case.

10. The connection assembly according to claim 9, wherein the fastening sides of the modular connector are interconnected via a connection side, the modular connector resting on one of the two sealing ribs in a transition region, in each case, between the connection side and one of the two fastening sides, and the connection side protruding, at a spacing from the sealing ribs, beyond a joint region in which the sealing ribs adjoin one another via a sealing element arranged there between, such that a free space is formed between the sealing ribs and the connection side, into which space the sealing element protrudes.

11. The connection assembly according to claim 10, wherein the connection side comprises at least one arrow punching, in which a threaded bolt, by means of which the modular connector is fixed to one of the fastening flanges, protrudes, at least one clamping tooth engaging, in a preloaded manner, in a thread of the threaded bolt at a boundary of the arrow punching, and thus fixing the threaded bolt.

12. The connection assembly according to claim 11, wherein the threaded bolt comprises an apex that transitions into the thread of the threaded bolt, such that the at least one clamping tooth is preloaded along the apex, which widens in the longitudinal direction of the bolt, when the modular connector is fixed to one of the fastening flanges.

13. The connection assembly according to claim 1, wherein the modular connector is formed in multiple parts comprising a first connector part that is fixed to a first of the opposing fastening flanges, and comprising a second connector part that is fixed to a second of the opposing fastening flanges, and the first connector part comprising a centering contour on an outer face that faces the second connector part, and the second connector part comprising a second centering contour, complementary to the first centering contour, on an outer face that faces the first connector part, the first and the second centering contour interlocking only in a mounting position in which the lateral profile frames adjoin one another via the sealing edges thereof and via a sealing element arranged there between.

14. The connection assembly according to claim 13, wherein the first and the second centering contours are each formed in two parts, each comprising a first centering contour portion for aligning the profile frames relative to one another in the vertical direction, and each comprising a second centering contour portion for aligning the profile frames relative to one another in the depth direction.

* * * * *